United States Patent

Ukegawa

[11] Patent Number: 6,128,419
[45] Date of Patent: Oct. 3, 2000

[54] IMAGE PROCESSING APPARATUS HAVING SCANNER AND METHOD FOR SHARING THE SCANNER WITH AN OPTICAL MARK READER

[75] Inventor: Takeshi Ukegawa, Hadano, Japan

[73] Assignee: Ricoh Company, Ltd., Tokyo, Japan

[21] Appl. No.: 08/880,148

[22] Filed: Jun. 20, 1997

Related U.S. Application Data

[63] Continuation of application No. 08/310,744, Sep. 22, 1994, abandoned.

[30] Foreign Application Priority Data

Sep. 30, 1993 [JP] Japan .................................. 5-243454

[51] Int. Cl.[7] .................................................. G06K 9/20
[52] U.S. Cl. ........................... 382/317; 382/100; 358/468
[58] Field of Search .................................. 382/317, 270, 382/312, 306, 100, 287; 358/468, 465, 466

[56] References Cited

U.S. PATENT DOCUMENTS

| | | | |
|---|---|---|---|
| 4,554,593 | 11/1985 | Fox et al. .............................. | 358/466 |
| 4,856,075 | 8/1989 | Smith ..................................... | 382/270 |
| 4,987,496 | 1/1991 | Greiven Kamp, Jr. ................. | 358/448 |
| 5,150,428 | 9/1992 | Leone et al. .......................... | 282/270 |
| 5,315,405 | 5/1994 | Okuwaki ................................ | 282/270 |
| 5,339,156 | 8/1994 | Ishii ...................................... | 358/468 |
| 5,390,031 | 2/1995 | Kang et al. ............................ | 358/468 |
| 5,452,379 | 9/1995 | Poor ...................................... | 382/317 |
| 5,485,287 | 1/1996 | Nakamura et al. .................... | 358/468 |
| 5,488,488 | 1/1996 | Shimizu ................................. | 358/468 |
| 5,515,171 | 5/1996 | Nara et al. ............................ | 358/438 |

FOREIGN PATENT DOCUMENTS 61-24368  2/1986  Japan ............................... H04N 1/04

OTHER PUBLICATIONS

Shao et al., "Practical considerations of the Wiener filtering technique on projection data for PET", IEEE Nuclear Science Symposium and Medical Imaging Conf., Oct. 1993.

Primary Examiner—Yon Couso
Attorney, Agent, or Firm—McDermott, Will & Emery

[57] ABSTRACT

A image processing apparatus includes a scanner scanning data from both document sheets and Optical Mark Reader (OMR) data sheets thereon, a converter converting data scanned by the scanner to digital multi-valued coded data, a multiplexer selecting a suitable threshold level for recognizing the digital multi-valued coded data from the document sheets and the OMR data sheets, and a comparator comparing digital multi-valued coded data from the document sheets and the OMR data sheets with a suitable threshold level to generate binary coded data.

37 Claims, 6 Drawing Sheets

IMAGE PROCESSING APPARATUS HAVING SCANNER AND METHOD FOR SHARING THE SCANNER WITH AN OPTICAL MARK READER

This application is a continuation of application Ser. No. 08/310,744 filed Sep. 22, 1994 now abandoned.

BACKGROUND OF THE INVENTION

1. Field of the invention

This invention relates to an image processing apparatus, such as a facsimile machine, a copier, a digital copier, an electrical filing system, an optical filing system, or a facsimile mail system, that performs scanning and recognizing of both image data and Optical Mark Reader (OMR) data on document sheets.

2. Description of the Related Art

Image processing apparatuses such as facsimile machines, copiers, digital copiers, electrical filing systems, optical filing systems, and facsimile mail systems sometimes have OMR capability. This OMR capability is a data input apparatus which scans documents for data in the form of pen marks, etc. This OMR capability has the advantage of not requiring the use of a keyboard for inputting data, and the OMR gets its input image data through the same apparatus as the scanner.

However, in such image processing apparatuses having OMR capability, there are many errors in reading OMR data on document sheets because noise or small dots can be read and interpreted as OMR data by a scanner set to read very fine image data.

SUMMARY OF THE INVENTION

It is therefore an object of the present invention to provide an image processing apparatus connected to a scanner for recognizing OMR data exactly, and a method for sharing operation with the apparatus of a scanner.

According to one aspect of the invention, the image processing apparatus includes a scanner that can scan both document sheets with image data and sheets with Optical Mark Reader (OMR) data, a converter for converting data scanned by the scanner to digital multi-valued coded data, and a comparator for comparing digital multi-valued coded data from document sheets and OMR data sheets with a suitable threshold level to recognize the data from the sheets. Data recognized from the document sheets and OMR data sheets can then be used to generate binary coded data.

According to another aspect of the invention, the image processing apparatus includes a multiplexer for selecting the suitable threshold level to recognize the digital multi-valued coded data from the document sheets and the OMR data sheets.

According to yet another aspect of the invention, the multiplexer selects the suitable threshold level from three different threshold levels for recognizing the digital multi-valued coded data from the document sheets and the OMR data sheets.

In a further aspect of the invention, the three different threshold levels consist of a black side level, a white side level, and a mid-level between the black side level and the white side level.

In a further aspect of the invention, the multiplexer selects the black side level when the scanner scans data on OMR data sheets.

In another aspect of the invention, the image processing apparatus includes an input device that inputs data on the suitable threshold level for recognizing the digital multi-valued coded data from the document sheets and the OMR data sheets.

According to an even further aspect of the invention, the image processing apparatus includes a corrector for performing a Modulation Transfer Function (MTF) correction.

In another aspect of the invention, the image processing apparatus includes a multiplexer for selecting a suitable threshold level for recognizing the digital multi-valued coded data from the document sheets or OMR data sheets, and for controlling the operation of the MTF correction. The comparator is also controlled by the multiplexer and compares the digital multi-valued coded data from the document sheets or OMR data sheets with the suitable threshold level selected by the multiplexer to generate binary coded data.

In an even further aspect of the invention, a image processing apparatus having MTF correction includes a scanner, a converter for converting data scanned by the scanner to digital multi-valued coded data, a multiplexer controlling the MTF correction, and a comparator also controlled by the multiplexer for comparing the digital multi-valued coded data from the document sheets or OMR data sheets to generate binary coded data.

According to another aspect of the invention, the multiplexer shuts off the MTF correction when the scanner scans data on OMR data sheets.

In the various aspects of the invention, the image processing apparatus may be a facsimile machine, a copier, a digital copier, an electrical filing system, an optical filing system, or a facsimile mail system.

Alternatively, the image processing apparatus may be a complex multi-functioned machine having the capabilities of a facsimile machine, a copier, a digital copier, a electrical filing system, an optical filing system, a facsimile mail system, or any two of the above devices.

The method of the invention for the OMR capability sharing operation with a scanner includes the steps of converting data scanned by the scanner to digital multi-valued coded data, selecting a suitable threshold level for recognizing the digital multi-valued coded data from sheets of OMR data, comparing the digital multi-valued coded data from the sheets of OMR data with a selected suitable threshold level to generate binary coded data.

The step of selecting the suitable threshold level may select from three different threshold levels for recognizing the digital multi-valued coded data from sheets having OMR data.

According to still a further feature of the invention, the three different threshold levels are consist of black side level, white side level, and mid level between the black side level and the white side level. The black side level may be selected when the scanner scans data from OMR data sheets.

BRIEF DESCRIPTION OF THE DRAWINGS

A more complete application of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
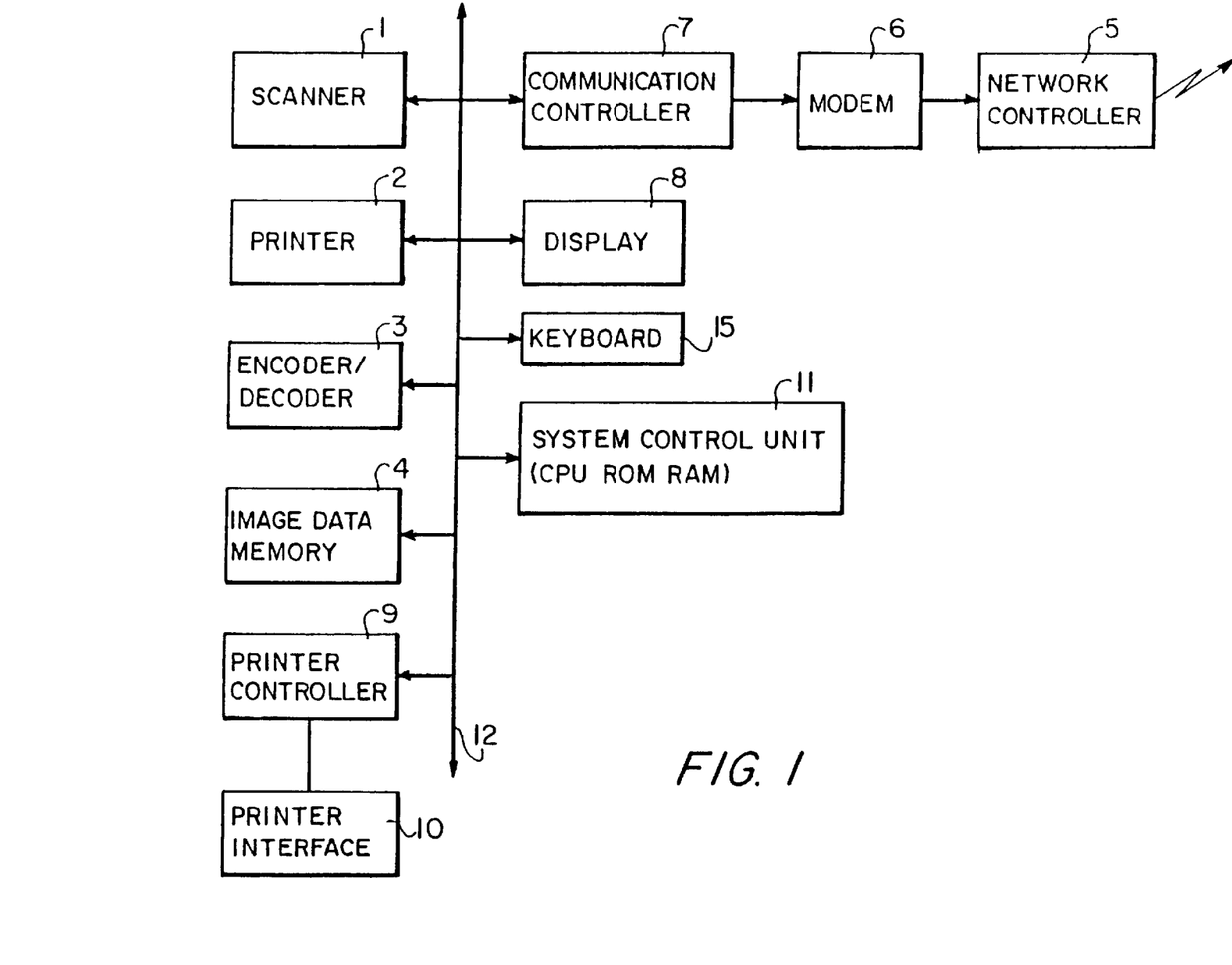
FIG. 1 is block diagram showing the image processing apparatus as a facsimile machine according to the present invention.

Referring now to the drawings, wherein like reference numerals designate identical or corresponding parts throughout the several views, and particularly to FIG. 1, there is illustrated an image processing apparatus of the present invention as a facsimile machine. The apparatus of FIG. 1 includes a scanner 1, a printer 2, an encoder/decoder 3, an image data memory 4, a network controller 5, a modulator/demodulator (MODEM) 6, a communication controller 7, a display 8, a printer controller 9, a printer interface 10, a system controller 11 including at least a CPU, a ROM, and a RAM, and an input device such as a keyboard 12. The elements of FIG. 1 are connected to each other by a bus 13.

The scanner 1 is for reading image data with a stated resolution from documents to be scanned. The printer 2 prints image data on paper or some other medium. The encoder/decoder 3 is for encoding data sent through the system controller 7, and decoding received data. The image data memory 4 is for storing image data temporarily to be transmitted or in the case of delayed delivery, to be received. It is noted that the memory 4 can store other types of data besides image data; it can store, for example, any type of data file transmitted from a PC. The network controller 5 is for accessing a public telecommunication circuit such as a telephone line. The modulator/demodulator (MODEM) 6 is for modulating or demodulating image data, and sending signals for transmission control procedures. The communication controller 7 is for controlling the network controller 5 and the MODEM 6 for facsimile communications according to transmission control procedures of the International Telegraph and Telephone Consultive Committee.

The display 8 is for displaying operation guidance or other information for operators. An input device 15 such as a keyboard, a mouse, etc. allows an operator to input data for sending and receiving operations in accordance with the displayed visual guidance. When control operations of the printer 2 are displayed, the input device 15 may send key code data to the printer controller 9, and the display 8 displays the data from the printer controller 9. It is to be noted that the input device 15 can be included within a pressure sensitive display device. The printer controller 9 is for receiving bit pattern data of documents from an external device, such as a personal computer to be processed by the system controller 11 as image information for example. The system controller 11 is mainly comprised of a central processing unit (CPU), read-only memory (ROM), and random access memory (RAM). The system controller 11 controls all operations of the facsimile machine. The bus 12 serves as a communication link between each of the elements in FIG. 1.

Figure 2:
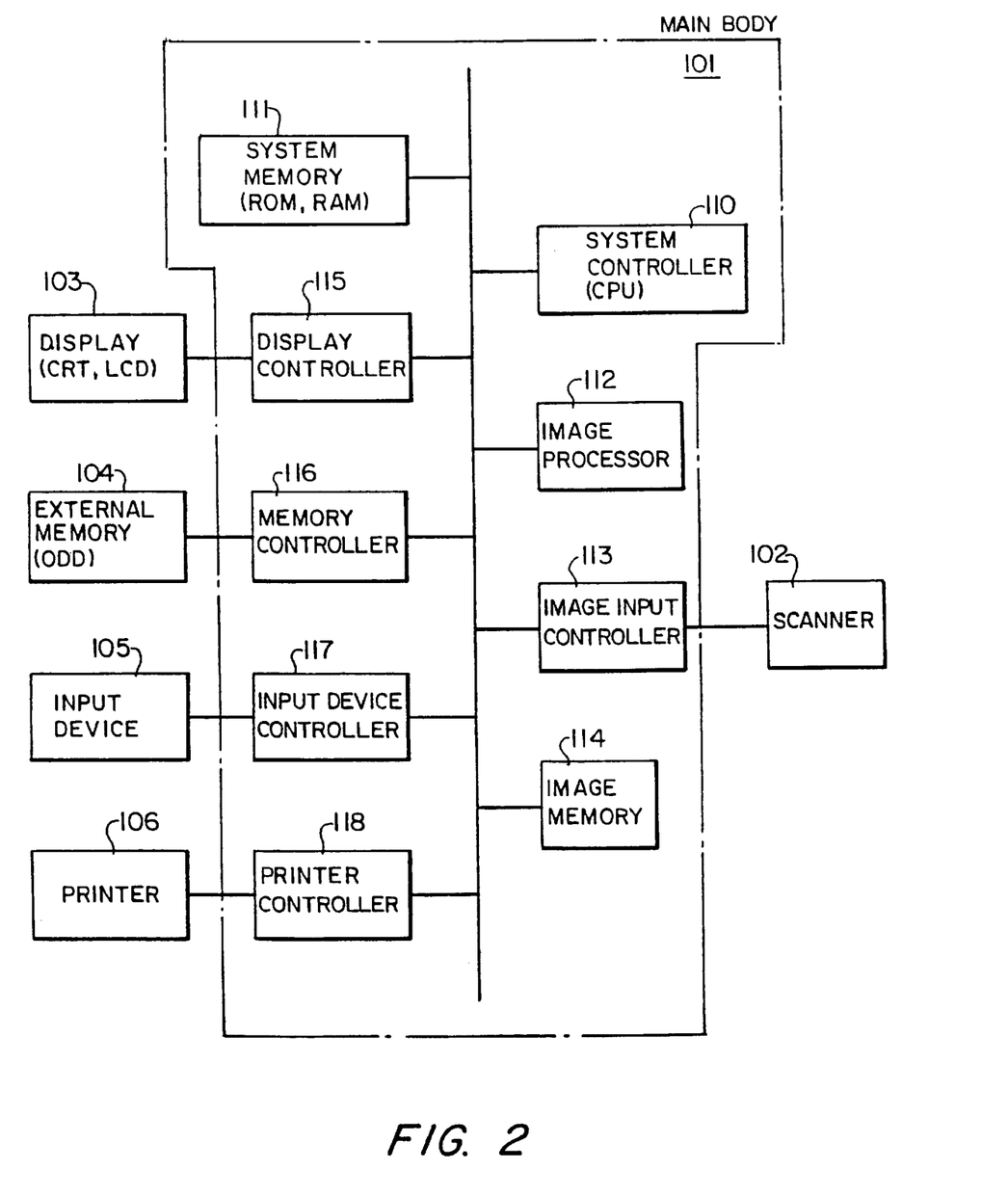
FIG. 2 is a block diagram showing the image processing apparatus as a filing system according to the present invention.

FIG. 2 is a block diagram showing a filing apparatus according to the present invention. As seen in FIG. 2, the filing apparatus includes a main body 101, a scanner 102, a display 103, an external memory 104 such as an optical disk apparatus, an operation input device 105 such as a keyboard or a mouse, and a printer 106.

The main body 101 includes mainly a system controller 110, a system memory 111, an image processor 112, an image input controller 113, an image memory 114, a display controller 115, a memory controller 116, an input device controller 117, and a printer controller 118.

The system controller 110 which includes CPU, controls the system according to the program stored in ROM, and uses RAM as working memory for processing, detecting, and operating with other components.

The image processor 112 processes image data in the image memory 114 for correction, enlargement, reduction, rotation, etc. The image input controller 113 inputs data of double-sided documents scanned by the scanner 102 and controls the storing of the data in the image memory 114 temporarily. The image input controller 113 includes a SCSI controller and a DMA controller.

The image memory 114 stores input image data from the image input controller 113, and temporarily stores searching data read from the external memory 104.

The display controller 115 controls the display of image data, operation information, etc. on the display 103.

The memory controller 116 controls the reading of image data temporarily memorized in the image memory 114 to be stored in the external memory 104. The memory controller 116 also controls reading of image data memorized in the external memory 104 to be stored in the image memory 114 for searching.

The input device controller 117 controls the receiving of data from input device 105 and the sending of data to the system controller 117.

The printer controller 118 controls the printer 6 in printing image data from the image memory 114.

Figure 3:
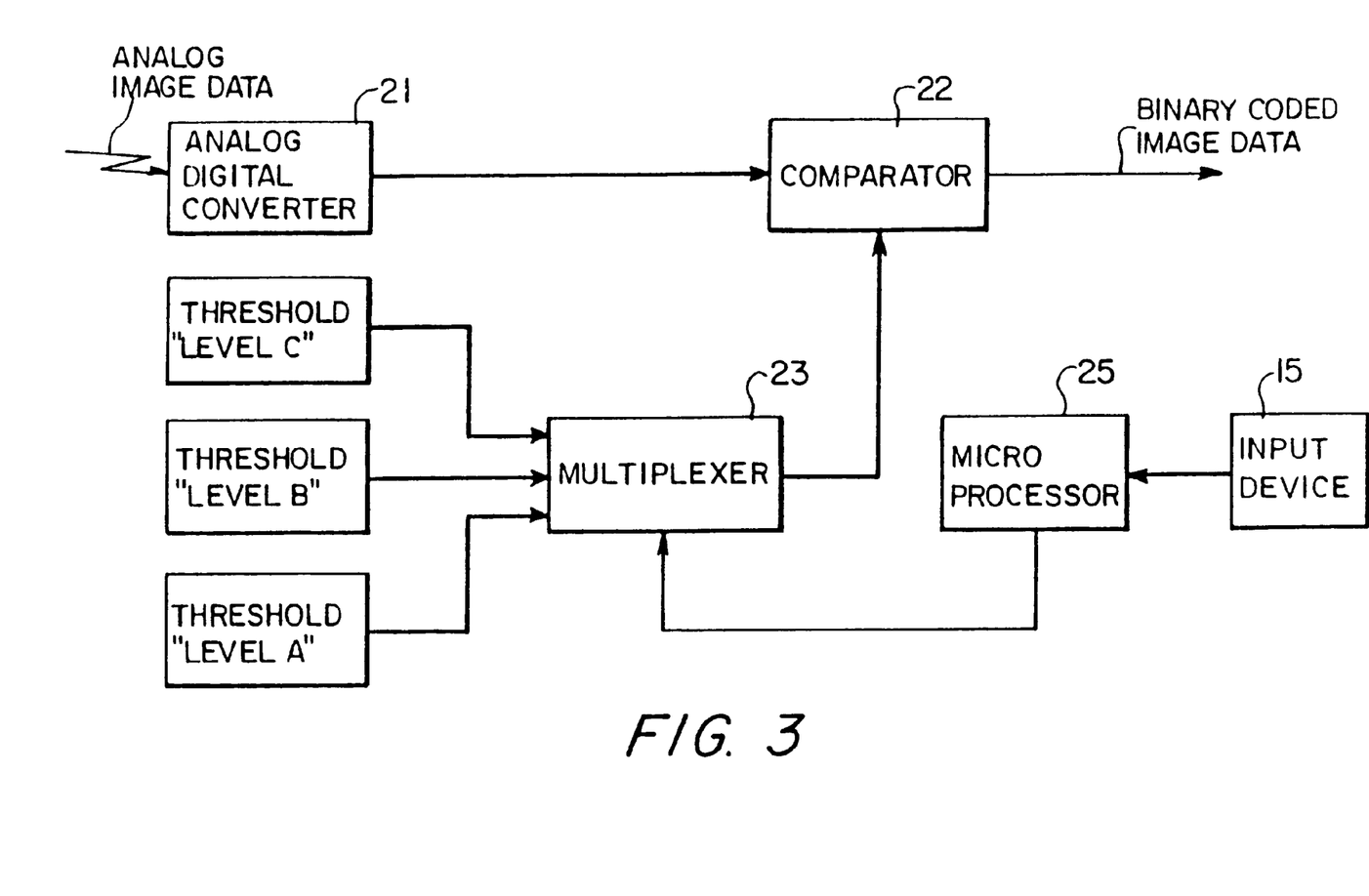
FIG. 3 is a block diagram showing the image processing apparatus according to a first embodiment of the invention.

FIG. 3 shows a block diagram illustrating the image processing apparatus. In this Figure, an analog-digital converter 21 converts input analog image data to multi-valued digital image data. A comparator 22 converts the multi-valued digital image data to binary coded image data by comparing with the threshold level selected by a multiplexer 23. There are three predetermined threshold levels. Threshold LEVEL A is the nearest level of three to the white level. Threshold LEVEL C is the nearest level of three to the black level. Threshold LEVEL B is the standard LEVEL between LEVEL A and LEVEL C. Generally, the multiplexer 23 selects threshold LEVEL B and sends data that can reach the LEVEL B threshold to comparator 22. When scanning OMR data sheets, the multiplexer 23 selects threshold LEVEL C and sends data reaching the LEVEL C threshold to comparator 22.

Figure 4:
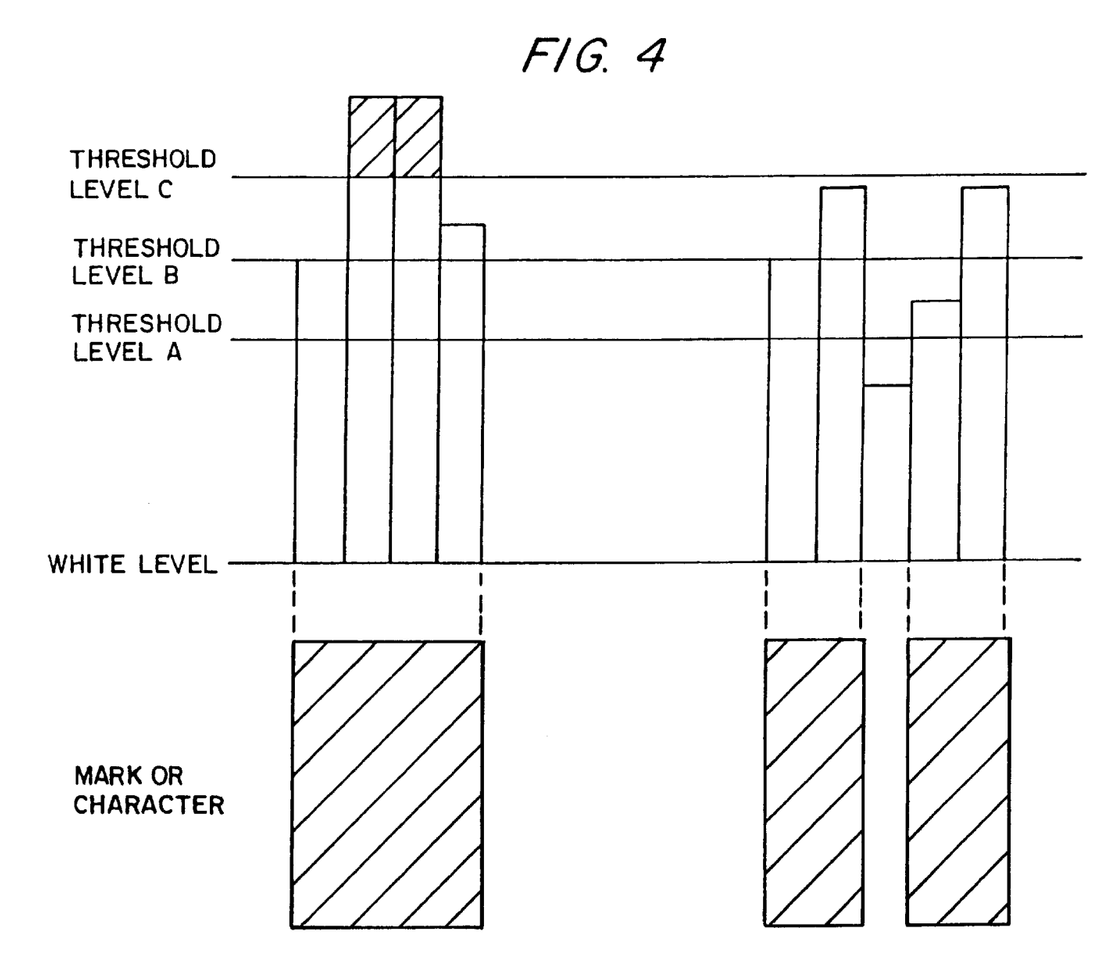
FIG. 4 illustrates the relationship of characters of a fine variation with the recognition levels of the invention and the relationship of marks of a bold variation with the recognition levels of the invention.

As seen in FIG. 4(b), fine variations in characters, especially Chinese characters, can hardly be scanned by a threshold level shifted to the black level side (LEVEL C). However, in the present embodiment, as seen in FIG. 4(a), it is enough to scan and compare with the threshold level shifted to the black level side (LEVEL C) because generally OMR data is marked boldly on OMR data sheets. In this embodiment, even if the selected threshold level is first shifted to the white (LEVEL A), LEVEL C may be selected when scanning OMR data sheets, and the threshold level may then be shifted back to either LEVEL A or LEVEL B when scanning document sheets again.

Next, the operations of the above embodiment will now be described. In the embodiment, the OMR data sheet is one page and positioned as the top sheet of the documents.

Figure 5:
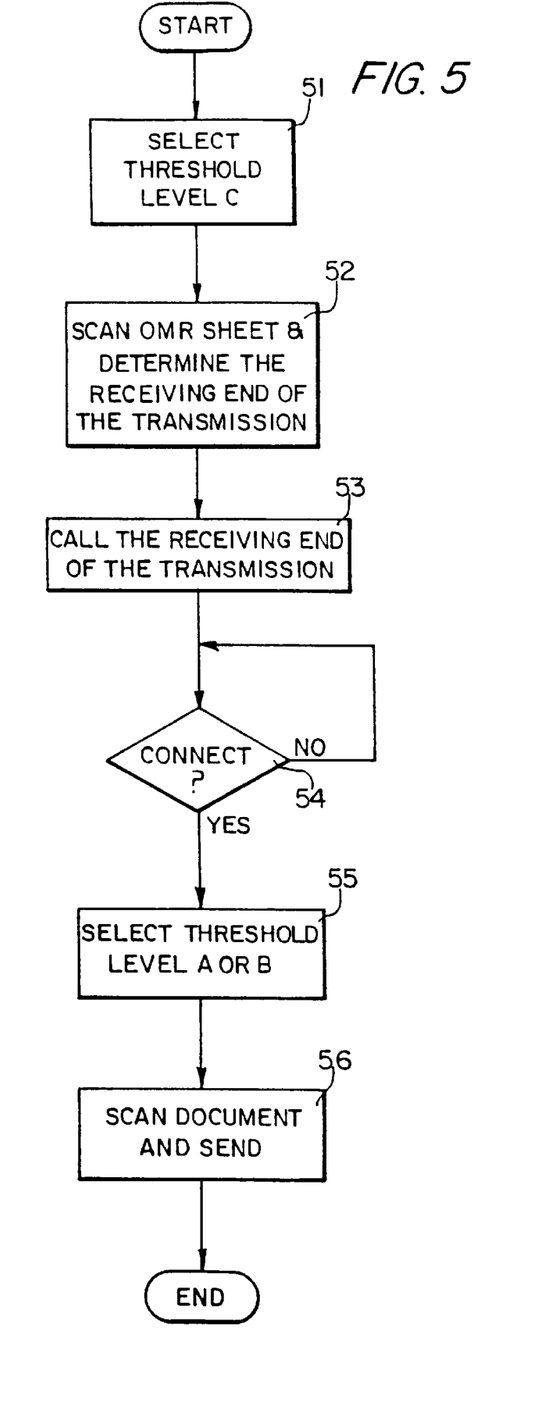
FIG. 5 is a flow chart showing the operation of the OMR capability in the image processing apparatus according to the first embodiment of the invention.

As seen in FIG. 5, when scanning OMR data sheets, the threshold LEVEL C is selected and shifted to black (step 51). The OMR data sheet is scanned and data on the OMR data sheet is recognized to determine the receiving end of the transmission based on the scanned data on the OMR data sheet (step 52). How to recognize scanning data as OMR data is as follows:

(1) Setting documents on a document table, an operator turns on a start key without inputting the data on the receiving end of the transmission. The operator turns on a confirmation key of OMR, for example a "YES"key. The top of the documents page is then set to be scanned as an OMR data sheet. (2) After turning on a "OMR SCAN" key, the operator turns on the start key, the top page of the documents is set to be scanned as an OMR data sheet.

Calling the receiving end of the transmission (step 53), when connecting for transmission (step 54), the threshold level is changed to the threshold LEVEL A or B (step 55). Data from the documents are scanned with the LEVEL A or B threshold, and the data is sent to the receiving end of the transmission (step 56). Thus, when scanning an OMR data sheet, changing the scanning threshold level to the black level (LEVEL C) allows the scanning to recognize exactly (without recognition errors) and easily without having loaded for other portions of the system.

In another embodiment, the density of scanning decided by an operator is inputted through the input device 15 to the multiplexer 23. A microprocessor 25 may also send data on the density to the multiplexer 23. The documents are scanned and signals representing the documents are converted to the threshold level decided by the operator according to the condition of the OMR data sheets. Thus, when scanning an OMR data sheet, the scanning threshold level is changed to the black level; when scanning an image data document, the scanning threshold level is changed to the standard level. This switching of threshold levels allows the system to recognize the data more exactly.

Figure 6:
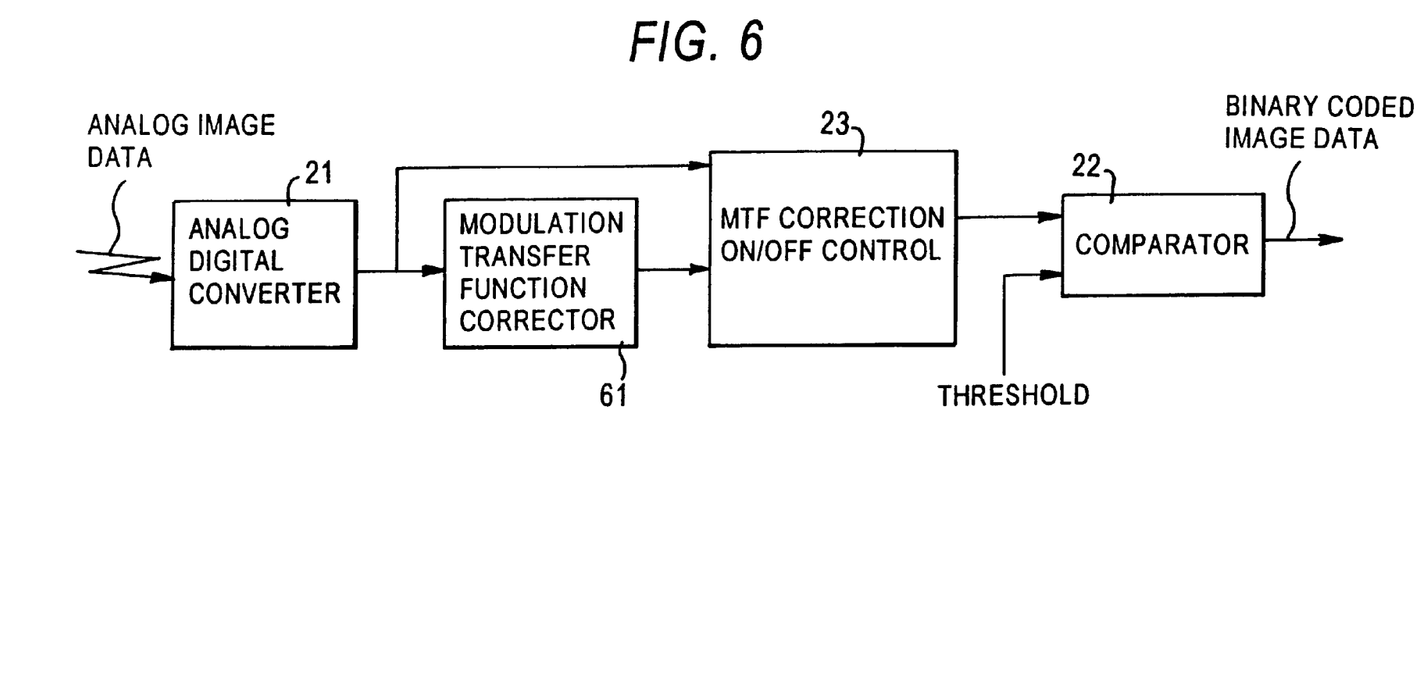
FIG. 6 is a block diagram showing the image processing apparatus according to a second embodiment of the invention.

FIG. 6 illustrates a block diagram showing the image processing apparatus in another embodiment. Modulation Transfer Function (MTF) correction provides the advantage of being able to clearly recognize characters by edge emphasis. However, it also has the disadvantage of reading extraneous surface (background) marks on a data sheet being scanned. When scanning an OMR data sheet, such extraneous marks or noise are hard to remove or filter out from the OMR data on the sheet.

In FIG. 6, the analog-digital converter 21 converts input analog image data to multi-valued digital image data. The comparator 22 converts the multi-valued digital image data to binary coded image data with a predetermined threshold level. A MTF corrector 61 corrects the multi-valued digital image data. The multiplexer 23 receives the multi-valued digital image data and controls the operation of the MTF correction.

Figure 7:
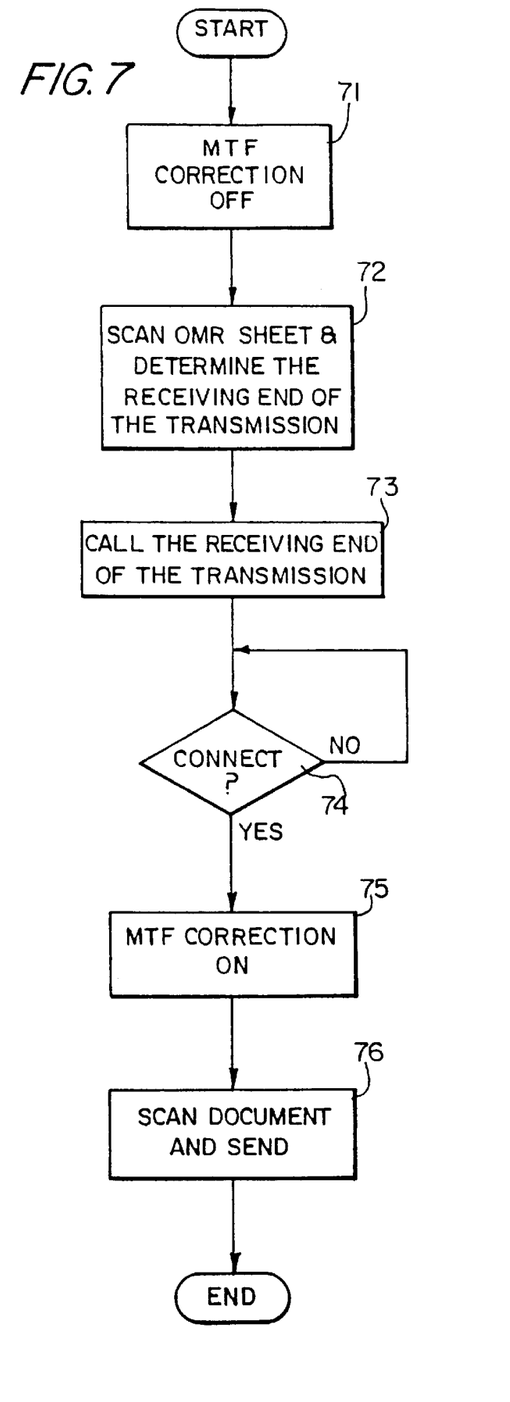
FIG. 7 is a flow chart showing the operation of the OMR capability in the image processing apparatus according to the second embodiment of the invention.

The operations of this embodiment will now be described. In the embodiment, any OMR data sheet is also positioned on top of the sheets. As seen in FIG. 7, when scanning an OMR data sheet, the MTF correction (step 71) is shut down. The step 71 is also capable of cutting off transmission from the MTF corrector 51 and continuing communication from the analog digital converter 21. Scanning the OMR data sheet and deciding the receiving end of the transmission from the scanned data on the OMR data sheet are performed at step 72. How to recognize scanning data as OMR data is as follows:

(1) Setting documents on a document table, the operator turns on a start key without inputting the data on the receiving end of the transmission. The operator then turns on a confirmation key of OMR, for example, a "YES" key. The top of the document pages is then set to be scanned as an OMR data sheet; or (2) After turning on the a key of "OMR SCAN", the operator turns on the start key. The top page of the document pages is also set to be scanned as an OMR data sheet.

The receiving end of the transmission is called (step 73). A determination is then made whether transmission can begin (step 74). If yes, the MTF correction process is activated (step 75). At step 75 analog digital converter 21 may be deactivated while the MTF corrector 51 is activated. Data from the documents are scanned through the MTF correction and sent to the receiving end of the transmission (step 76). When scanning an OMR data sheet, with the MTF correction deactivated, OMR data may be recognized exactly (without recognition errors) and easily without having loaded other parts of the system.

Obviously, numerous modifications and variations of the present invention are possible in light of the above teachings. It is therefore to be understood that within the scope of the appended claims, the invention may be practiced otherwise than as specifically described herein.

What is claimed:

1. An image processing apparatus comprising:
    a scanner for scanning data from first type sheets and second type sheets;
    a converter for converting data scanned by said scanner to digital multi-valued coded data;
    a comparator for comparing digital multi-valued coded data of said first type sheets and said second type sheets with a threshold level to generate binary coded data representing the data on said first type sheets and said second type sheets; and
    a corrector, arranged to receive a signal from an operator indicative of whether the scanner is scanning first type sheets or second type sheets, to perform Modulation Transfer Function (MTF) correction on said digital multi-valued coded data from said first type, sheets and outputs MTF corrected data, said corrector being switched off when said scanner is scanning second type sheets and being switched on to output said MTF corrected data when said scanner is scanning first type sheets.

2. An image processing apparatus as claimed in claim 1, further comprising a multiplexer selecting said threshold level.

3. An image processing apparatus as claimed in claim 2, wherein said multiplexer selects said threshold level from three different threshold levels.

4. An image processing apparatus as claimed in claim 3, wherein said three different threshold levels comprise a black side level, a white side level, and a mid-level between said black side level and said white side level.

5. An image processing apparatus as claimed in claim 4, wherein said multiplexer selects said black side level when Paid scanner is scanning OMR data sheets.

6. An image processing apparatus as claimed in claim 1, further comprising an input device inputting data for selecting a threshold level.

7. An image processing apparatus as claimed in claim 6, wherein said input device inputs data which selects said threshold level from three different threshold levels.

8. An image processing apparatus as claimed in claim 7, wherein said three different threshold levels comprise a black side level, a white side level, and a mid-level between said black side level and said white side level.

9. An image processing apparatus as claimed in claim 1, further comprising a multiplexer, responsive to said signal, for selecting and outputting one of said digital multi-valued coded data when said scanner is scanning second type sheets and said MTF corrected data when said scanner is scanning first type sheets, said multiplexer being connected to the output of said corrector, wherein said comparator is configured to compare said one of said digital multi-valued coded data and said MTF corrected data output from said multiplexer with said threshold level to generate binary coded data.

10. An image processing apparatus for performing Modulation Transfer Function (MTF) correction, comprising:

a scanner for scanning data from first type sheets and second type data sheets;

a converter for converting data scanned by said scanner to digital multi-valued coded data;

a multiplexer, arranged to receive a signal from an operator indicative of whether the scanner is scanning first type sheets or second type sheets, and having means for performing MTF correction of said multi-valued coded data and outputting MTF corrected data, the multiplexer selectively outputting one of said digital multi-value coded data in response to said signals, when said scanner is scanning second type sheets and said MTF corrected data when said scanner is scanning first type sheets; and a comparator for comparing said digital multi-valued coded data or said MTF corrected data output by said multiplexer with a threshold level to generate binary coded data.

11. A system, comprising:

a scanner for scanning data from first type sheets and second type data sheets;

an image processing system hating a converter for converting data scanned by said scanner to digital multi-valued coded data and a comparator for comparing digital multi-valued coded data with a threshold level to generate binary coded data representing the scanned data; and a corrector, arranged to receive a signal from an operator indicative of whether the scanner is scanning first type sheets or second type sheets, to perform Modulation Transfer Function (MTF) correction on said digital multi-valued coded data from said first sheets, said corrector being switched off when said scanner scans second type sheets and being switched on to output MTF corrected data when said scanner scans document sheets.

12. A system as claimed in claim 11, wherein said apparatus comprises a facsimile machine.

13. A system as claimed in claim 11, wherein said apparatus comprises a copier.

14. A system as claimed in claim 11, wherein said apparatus comprises a digital copier.

15. A system as claimed in claim 11, wherein said apparatus comprises an electrical filing system.

16. A system as claimed in claim 11, wherein said apparatus comprises an optical filing system.

17. A system as claimed in claim 11, wherein said apparatus comprises a facsimile mail system.

18. A system as claimed in claim 11, wherein said apparatus comprises a multi-functioned complex machine having components for operating as any two from the group of a facsimile machine, a copier, a digital copier, a electrical filing system, optical filing system, and a facsimile mail system.

19. An image processing apparatus as claimed in claim 1, wherein:

sand scanner is configured to scan the data from a plurality of sheets in a group of sheets; and said corrector is switched off in response to the signal only for the first sheet of the plurality of sheets.

20. An image processing apparatus as claimed in claim 10, wherein:

said scanner is configured to scan the data from a plurality of sheets in a group of sheets; and said multiplexer is configured to selectively output the MTF corrected data in response to the signal only for the first sheet of the plurality of sheets.

21. A system as claimed in claim 11, wherein:

said scanner is configured to scar the data from a plurality of sheets in a group of sheets; and said corrector is configured to be switched on to output the MTF corrected data in response to the signal only for the first sheet of the plurality of sheets.

22. An image processing apparatus as claimed in claim 1, wherein said corrector is configured to perform the MTF correction on digital multi-valued coded data from an entire document sheet.

23. An image processing apparatus as claimed in claim 10, wherein said means for performing MTF correction performs the MTF correction of multi-valued coded data from an entire document sheet.

24. A system as claimed in claim 11, wherein said corrector is configured to perform the MTF correction on digital multi-valued coded data from an entire document sheet.

25. An image processing apparatus as claimed in claim 1, wherein:

the first type sheets are document sheets; and the second type sheets are Optical Mark Reader (OMR) data sheets.

26. An image processing system as claimed in claim 10, wherein:

the first type sleets are document sheets; and the second type sheets are Optical Mark Reader (OMR) data sheets.

27. A system as claimed in claim 11, wherein:

the first type sheets are document sheets; and the second type sheets are Optical Mark Reader (OMR) data sheets.

28. A method of processing images on a batch of sheets, comprising the steps of:

scanning data from a first sheet from the batch of sheets;

converting the data into digital multi-valued coded data;

receiving a signal from an operator indicative of a pre specified sheet type; and if the signal does not indicate the pre specified sheet type, then performing Modulation Transfer Function (MTF) correction on the digital multi-value coded data co produce MTF corrected data.

29. A method as claimed in claim 28, further comprising the steps of:

selecting a threshold level based on the signal;

comparing the digital multi-value coded data with the threshold level, if the signal is indicative of the pre specified sheet type; and comparing the MTF corrected data with the threshold level, it the signal is not indicative of the pre specified sheet type.

30. A method as claimed in claim 29, further comprising the steps of:

scanning second data from a subsequent sheet from the batch of sheets;

converting the second data into second digital multi-valued coded data; and performing the MTF correction on the second digital multivalue coded data to produce second MTF corrected data; and comparing the second MTF corrected data with the threshold selected if the signal is not indicative of the pre specified sheet type.

31. A method as claimed in claim 28, further comprising the steps of:

scanning second data from a subsequent sheet from the batch of sheets;

converting the second data into second digital multi-valued coded data; and performing the MTF correction on the second digital multivalue coded data to produce second MTF corrected data.

32. A method as claimed in claim 28, wherein the step of receiving a signal from an operator indicative of a prespecified sheet type includes the step of receiving the signal from the operator indicative of an Optical Mark Reader (OMR) data sheet type.

33. A method of processing images on a batch of sheets, comprising the steps of:

scanning data from a first sheet from the batch of sheets;

converting the data into digital multi-valued coded data;

receiving a signal from a an operator indicative of one of a first sheet type and a second sheet type; and if the signal indicates the second sheet type, then performing Modulation Transfer Function (MTF) correction on the digital multi-valued coded data to produce MTF corrected data.

34. A method as claimed in claim 33, further comprising the steps of:

selecting a threshold level based on the signal;

comparing the digital multi-valued coded data with the threshold level, if the signal indicative of the first sheet type; and comparing the MTF corrected data with the threshold level, if the signal is indicative of the second sheet type.

35. A method as claimed in claim 34, further comprising the steps of:

scanning second data from a subsequent sheet from the batch of sheets;

converting the second data into second digital multi-valued coded data;

performing the MTF correction on the second digital multi-valued coded data to produce second MTF corrected data; and comparing the second MTF corrected data with the threshold level, if the signal is indicative of the second sheet type.

36. A method as claimed in claim 33, further comprising the steps of:

scanning second data from a subsequent sheet from the batch of sheets;

converting the second data into second digital multi-valued coded data; and performing the MTF correction on the second digital multi-valued coded data to produce second MTF corrected data.

37. A method as claimed in claim 33, wherein the first sheet type includes an Optical Mark Reader (OMR) data sheet type.

* * * * *